United States Patent [19]

Jansen et al.

[11] Patent Number: 5,022,017
[45] Date of Patent: Jun. 4, 1991

[54] MAGNETO OPTIC DATA RECORDING SYSTEM WITH VARIABLE FIELD STRENGTH, ACTUATOR THEREFOR AND METHOD OF PROVIDING

[75] Inventors: Gerardus L. M. Jansen, Cascade; Matthew W. Hecht, Louisville, both of Colo.

[73] Assignee: Laser Magnetic Storage International Company

[21] Appl. No.: 284,069

[22] Filed: Dec. 14, 1988

Related U.S. Application Data

[63] Continuation-in-part of Ser. No. 188,261, Apr. 29, 1988, Pat. No. 4,962,492.

[51] Int. Cl.$^5$ .................. G11B 13/04; G11B 11/12
[52] U.S. Cl. ................. 369/13; 360/114; 360/59
[58] Field of Search ............ 369/13; 360/114, 59; 365/122

[56] References Cited

U.S. PATENT DOCUMENTS

| | | | |
|---|---|---|---|
| 4,748,606 | 5/1988 | Naito et al. | 369/13 |
| 4,868,802 | 9/1989 | Kobori | 369/13 |

FOREIGN PATENT DOCUMENTS

| | | | |
|---|---|---|---|
| 57-176505 | 10/1982 | Japan . | |
| 60-226044 | 11/1985 | Japan | 369/13 |
| 60-261052 | 12/1985 | Japan | 369/13 |
| 62-124644 | 6/1987 | Japan | 360/114 |
| 63-316346 | 12/1988 | Japan . | |

Primary Examiner—Stuart S. Levy
Assistant Examiner—Hoa Nguyen
Attorney, Agent, or Firm—Sheridan, Ross & McIntosh

[57] ABSTRACT

For magneto-optic data recording, permanent magnets are used to produce a magnetic field with a variable field strength. The field strength is varied by controlled rotation of the magnets about their longitudinal axis, which also allows inversion of the direction of the magnetic field. The magnets are oriented such that their combined fields produce a resultant force continuously substantially perpendicular to the recording medium despite rotation of the magnets.

15 Claims, 6 Drawing Sheets

9A

9B

9C

9D

MAGNETO OPTIC DATA RECORDING SYSTEM WITH VARIABLE FIELD STRENGTH, ACTUATOR THEREFOR AND METHOD OF PROVIDING

This application is a continuation-in-part of copending application Ser. No. 188,261 filed Apr. 29, 1988 now U.S. Pat. No. 4,962,492.

FIELD OF THE INVENTION

The present invention relates to a system for data recording of a magneto-optic type and particularly a system and method for producing a variable field-strength magnetic bias field for data recording and erasing.

BACKGROUND INFORMATION

Although several magneto-optic recording schemes have been proposed, the scheme of most interest with respect to the present invention depends on the existence of a recording medium displaying two effects. The first is the Kerr magneto-optic effect. A material which displays the Kerr magneto-optic effect produces a change in the polarization of light which reflects from a magnetized area of the material. For example, polarized light which falls on a magnetized area will undergo rotation of the polarization plane upon reflectance from an area magnetized in a given polarity A rotation in the opposite direction is produced by an oppositely-magnetized area.

The second effect is the effect under which media have a high coercive force at low temperature and a low coercive force at high temperature; i.e., under the second effect the media are more easily magnetized at high temperatures than at low temperatures.

In a magneto-optic system, data can be recorded on the medium by using a heat source to heat an area of the medium above the temperature at which the medium is magnetizable and exposing the heated medium to a low global magnetic field Upon cooling, the area which was heated and exposed to the magnetic field will be magnetized. Initially, the medium is normally bulk polarized in one direction. Thereafter, it is possible to detect whether a given area of the medium is or is not magnetized in a desired magnetic polarity by reflecting polarized light from the area and detecting rotation of the light. In this way, areas of a medium can be designated as marks for representing binary digits or bits and the binary value of a mark can be assigned according to the presence or absence of predetermined direction and/or amount of rotation of polarized light, which will correspond to an upward or downward magnetization of the area of the medium. By reversing the polarity of the bias field and heating a written area the area will return to the original bulk-magnetized direction. In this way, one can erase old information. Magneto-optic systems generally of this type are described in Mark H. Kryder "Magneto-Optic Recording Technology", J. Appl. Bhys. Vol. 57 No. 1, pp. 39113-3918 and Nobutake Imamura, "Research Applies Magnetic Thin Films and the Magneto-Optical Effect in Storage Devices", Journal of Electrical Engineering, March 1983, pp. 100–103.

A system of this type requires at least four parts: a medium displaying both of the above-described effects; a heat source for heating an area of the medium to the magnetization temperature; a magnetic field source; and apparatus for detecting whether a given area of the medium has been magnetized with a given polarity. Each of these four components can be provided in a number of forms and configurations.

Particularly preferred in connection with the present invention is a magnetic field source which includes a permanent magnet and a heat source which is a laser. A magneto-optical disk exerciser using a permanent magnet is briefly described in K. Ohta, et al. "Magneto-Optical Disk With Reflecting Layers", SPIE Vol. 382, pp. 252–259.

In a system in which it is desired that marks be not only writable to the medium but also erasable therefrom, the apparatus should be capable of producing a magnetic field in either of two polarities, e.g. substantially perpendicular to the plane of the recording medium and directed upward or substantially perpendicular to the plane of the recording medium and directed downward. In this way, it is possible to designate a convention by which one of the two magnetic polarities represents a mark and the other of the two magnetic polarities represents the absence of a mark. One method of providing a magnetic field in either of the polarities is to use an electromagnet. Although an electromagnet provides for easy control of magnetic polarity, it typically requires expenditure of high amounts of energy, particularly when it extends across the entire expanse of the recording medium (e.g. as is sometimes done to reduce weight of a movable carriage). Low energy consumption is particularly important in data storage devices used in connection with small computer installations such as personal computers.

An alternative to the use of electromagnets is the use of a permanent magnet device. Permanent magnet devices which have thus far been proposed, while they may be useful in reducing energy requirements, suffer from several disadvantages. One disadvantage relates to the fact that such devices do not provide for a variable field strength of the desired-orientation magnetic field. The magnetic field strength is defined by the nature of the magnet and, in previous devices, cannot be varied without also varying the orientation of the magnetic field. Thus, as a permanent magnet is moved or rotated from a position where it produces the first magnetic polarity, the field strength of the recording medium will change but also the orientation of the magnetic field at the recording medium will change. In previous permanent magnet devices, it has not been possible to produce a magnetic field at the recording medium which is both of a desired orientation, for example, always perpendicular to the recording medium, and of variable intensity. Having a magnetic field which is not of variable magnitude when in the desired orientation is disadvantageous because the magnetic characteristics of the recording medium may not be completely homogeneous across the entire recording medium surface, thus requiring either varying field intensities at various portions of the recording medium, or varying laser intensity.

A second shortcoming of previous permanent magnet devices relates to the control for moving or turning the magnet. The amount of time required to change from one magnetic polarity to another magnetic polarity, at least in part, affects the speed and efficiency with which data can be written and erased on the recording medium. To achieve flexibility and efficiency in recording and erasing data, it would be desirable to be able to achieve reversal of the magnetic field in a short time period, and in a time period which is independent of other movements or portions of the apparatus.

Yet another disadvantage of previous permanent magnet systems relates to the physical configuration or arrangement of such systems. When a system is arranged or configured such that apparatus (including permanent magnets, optical carriages or other apparatus) are disposed on both sides of a planar recording medium, the total height or space required to accommodate such an apparatus is greater than would otherwise be required. Such a configuration is provided in order to achieve the necessary field strength and orientation at the recording medium (while avoiding magnetic interference with other portions of the apparatus) by positioning the magnet close to the medium. Position of the magnet close to the medium provides reduced overall field strength requirements and/or provides for a lower-mass permanent magnet, while reducing energy requirements for turning the magnet. Reduction of height requirements is particularly important in recording systems used in conjunction with a computer system which is physically small. A typical personal computer system accommodates a disk-type recording apparatus in a space having a height of only about 3 inches (about 8 centimeters) or, in a "half-height" configuration, of about 1½ inches (about 4 centimeters).

In view of the foregoing, it would be advantageous to provide an erasable magneto-optic data recording device which achieves relatively low energy consumption, produces a variable field-strength magnetic field in a desired orientation, is capable of magnetic polarity reversal in a time period which is short and which is independent of the movement or properties of other portions of the device or system, and/or is configured to minimize or reduce the height or volume requirements for the data recording apparatus or system.

SUMMARY OF THE INVENTION

In accordance with achieving a compact, efficient variable-intensity recording and erasing device, one aspect of the present invention includes positioning the magnet on the same side of the disk as the optics. In this manner, overall height requirements of the device are reduced compared with previous devices.

Another aspect of the invention includes providing two permanent magnets which are configured so that the resultant magnetic field from the fields of the two permanent magnets is of variable field intensity yet has the desired orientation at the recording medium. The second aspect of the invention is particularly useful in conjunction with the first aspect of the invention when using permanent magnets because the permanent magnets can be positioned on either side of the optics to produce a resultant magnetic field which is substantially perpendicular to the plane of the recording medium and having the necessary field strength. The field strength from two magnets at the portion of the medium which is heated by the optics device is greater than the field strength which would result from either magnet by itself.

Preferably, the recording/erasing system includes two permanent magnets rotatable about parallel axes which are parallel to the recording medium and extend across substantially all of the radial expanse of the recording medium. Preferably, the rotations of the two magnets are coordinated by a gear device driven by an electric motor. In this way, rotation of the magnets is controlled to provide the desired polarity in a manner which is rapidly switchable and not directly dependent upon movement of other parts of the apparatus such as rotation of the recording medium disk.

DETAILED DESCRIPTION OF THE PREFERRED EMBODIMENT

Figure 1:
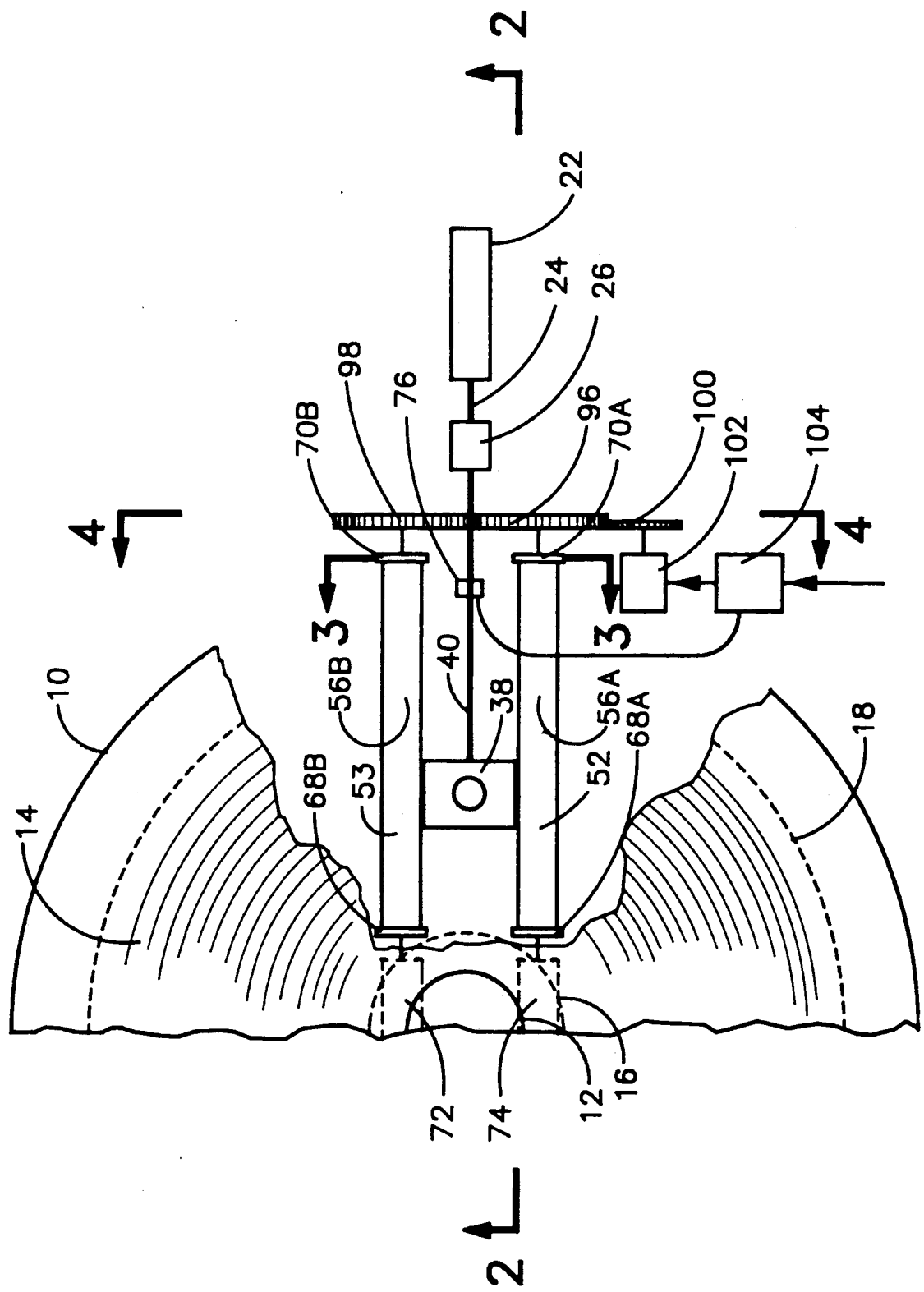
FIG. 1 is a schematic top plan view of a magneto-optic apparatus according to the present invention with a portion of the recording medium disk broken away.

Referring now to FIG. 1, there is schematically depicted a magneto-optic recording system according to the present invention. A disk 10 rotatable about the center of a hub 12 includes a recording area 14 of magnetizable material bounded by inner and outer edges 16, 18 defining the radial extent of the recording area. The magnetic material displays both the Kerr magneto-optic effect and the Curie effect. The medium can comprise a Gallium-Terbium-Iron compound or alloy. Such a medium is magnetizable upon exposure to a magnetic field having a magnetic field intensity of about 250 oersteds and a magnetic flux density of 250 gausses when heated to a temperature of at least about 200° C. When at a temperature below about 150° C., the medium 14 will not become magnetized at a magnetic field intensity of 250 oersteds. In the preferred embodiment, the diameter of the disk 10 is approximately 5 inches (about 125 millimeters). The disk 10 has a stiffness such that upon rotation, the vertical displacement or wobble is preferably less than about 0.5 millimeters. The disk 10 is rotated at about 36 hertz providing a revolution time of about 27 milliseconds.

Figure 2:
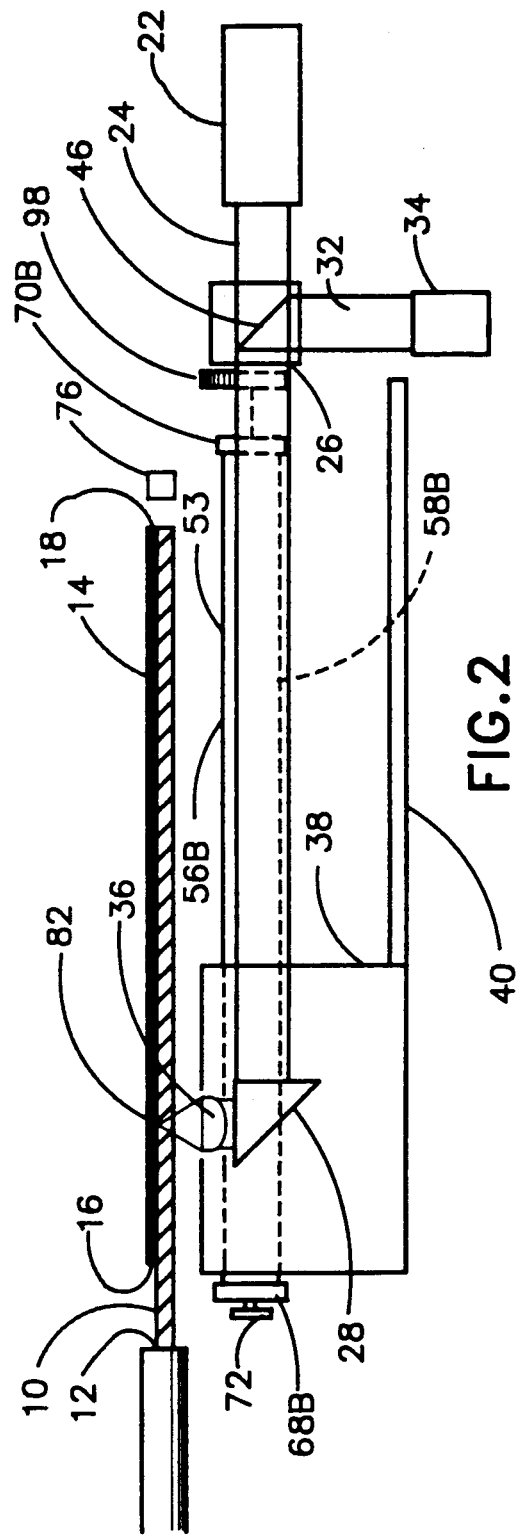
FIG. 2 is a side elevational view of the apparatus of FIG. 1.

Referring now to FIG. 2, a laser light source 22 is located to provide a light beam 24 which travels through a beam splitting device 26. Light from the laser 22 is then directed towards the disk 10, for example, by being reflected from a mirror 28 or other beam axis-changing device. The beam splitter 26 has the characteristic that light reflected from the disk 14 is partly reflected or otherwise has its direction changed to provide a reflected beam 32 to a detecting apparatus 34. The mirror 28 and possibly a focusing device such as a lens 36 are mounted on a means for radial movement, such as a carriage 38 and a rail 40 system. Systems for reflecting a focused light beam from a recording medium are well known and generally described in, for example, U.S. Pat. No. 4,586,092 issued Apr. 29, 1986 to Martens, et al. and U.S. Pat. No. 4,630,249 issued Dec. 16, 1986 to Braat, et al. In the present system, the light beam 24 is approximately 4.5 mm in diameter and produces an area on the disk 10 which is heated to above about 250° C. and has a diameter of about 1 micrometer.

The detecting system 34 and/or optional axis changing system 26 are configured to preferentially detect polarization of light which is reflected from a portion of the disk 10 which is magnetized in a first magnetic polarity. The system is able to distinguish between light reflected from areas of the disk 10 which are magnetized in such first polarity and areas of the disk 10 which are magnetized in a second magnetic polarity. One method of providing for such discrimination is to provide the detecting apparatus 34 with a polarization-sensitive device 46, such as a polarizing beam splitter, a sheet polarizer, a Rochon prism or a Wallaston prism (oriented in the proper angular orientation). The device 46 will change the modulation of polarity to a modulation of intensity for detection by the detector or detectors 34. The detector or detectors 34 will change the intensity modulation to an electrical current modulation. Because the medium 14 displays the Kerr magneto-optic effect, the polarization of light reflected from the disk 10 will be affected by the magnetic polarity of the area of the disk 10 from which the light is reflected.

Figure 3:
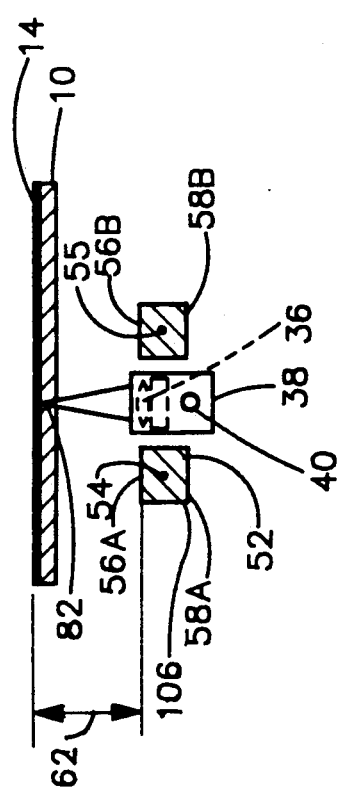
FIG. 3 is a cross sectional view taken along line 3—3 of FIG. 1.

First and second permanent magnets 52, 53 are mounted adjacent to portions of the disk 10. The permanent magnets 52, 53 are preferably a high grade magnetic material, such as a neodymium iron boron alloy, e.g. material marketed under the name "Crumax 32" of Colt Corporation. The permanent magnets 52, 53 are capable of producing a resultant magnetic field with a magnetic flux density of at least about 280 oersted, preferably at least 350 oersted at the surface of the disk 10 along the entire width of the writing area bounded by inner and outer boundaries 16, 18. Preferably the permanent magnets 52, 53 extend about 10 mm beyond the boundaries 16, 18. As best seen in FIG. 3, the magnets 52, 53 preferably have square cross sections, although other configurations of the magnets 52, 53 are possible. It has been found that a square cross section provides a useful combination of magnetic field intensity at the surface of the disk 10 and moment of inertia about the longitudinal axes 54, 55 of the magnets 52, 53. In particular, it has been found that a square cross section produces a higher field per unit of moment of inertia than does a magnet of circular cross section.

The magnets 52, 53 have a first surface 56A, 56B and a second surface 58A, 58B. The magnetic properties of the permanent magnets 52, 53 are such that the spaces adjacent to the first surfaces 56A, 56B have a first magnetic polarity while the spaces adjacent the second surfaces 58A, 58B have a second magnetic polarity opposite to the first magnetic polarity In the preferred embodiment, the width of each face of the rectangular magnets 52, 53 is about 4.5 millimeters. The distance 62 between the first or second faces 56, 58 and the surface of the disk 10 is about 2.5 millimeters. The length of the permanent magnets 52, 53 is about 52.5 millimeters. The magnets 52, 53 are mounted in holders 68A, 68B, 70A, 70B, attached to bearings 72, 74. A sensor 76 for sensing the field strength produced by the permanent magnets 52, 53 can be provided to assist in determining the rotational position of the permanent magnets 52, 53, for example, by use of one or more Hall sensors or gaussmeters. Also, optical sensing markers on the magnets 52, 53 or holders 68A, 68B can be used in determining magnet position.

Figure 7:
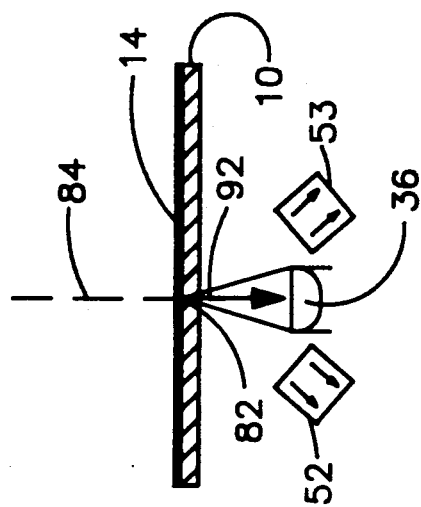
FIG. 7 is a schematic depiction of the apparatus shown in FIG. 5 but with the permanent magnets in a third rotational configuration.
Figure 6:
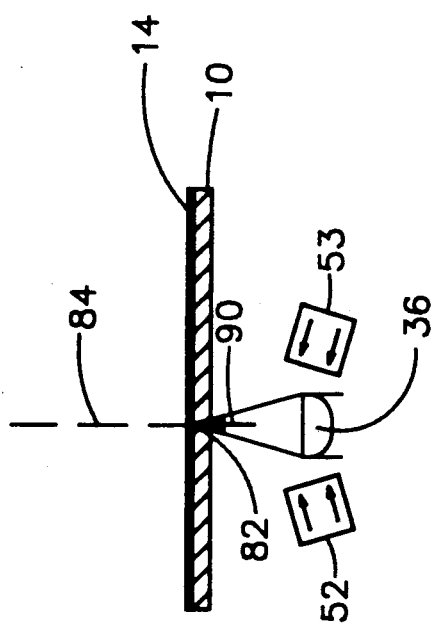
FIG. 6 is a schematic depiction of the apparatus of FIG. 5 but,, with the permanent magnets in a second rotational configuration.
Figure 5:
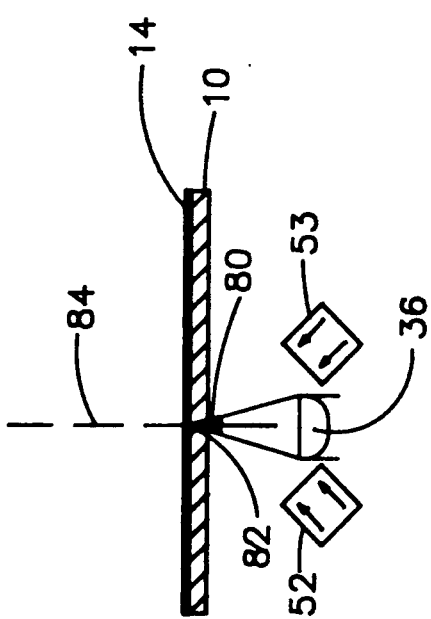
FIG. 5 is a schematic depiction of the apparatus shown in FIG. 3 with the permanent magnets in a first rotational position and depicting the resultant magnetic field at the heated portion of the recording medium.

Referring to FIG. 5, the magnitude and orientation of the magnetic field at the heated portion of the disk which results from interaction of the magnetic fields produced respectively by the first magnet 52 and second magnet 53 is depicted schematically by an arrow 80. The magnetic field depicted by the arrow 80 represents the field at that portion of the recording area 14, which is impinged by the focused light beam or readout spot 82. The magnitude of that portion of the magnetic field 80 and the direction, at least for purposes of the present description, is equal to the vector sum of the magnetic field contribution of the first magnet 52 and the second magnet 53. By positioning the first and second magnets 52, 53 such that the respective magnetic field contributions from the two magnets 52, 53 in the vicinity of the readout spot 82 are substantially symmetric with respect to an imaginary line 84 passing through the readout spot 82 and perpendicular to the plane of the recording area 14. The orientation of the magnetic field 80 in the vicinity of the focused spot 82 is substantially perpendicular to the plane of the recording medium 14. Provided the spatial configuration of the magnetic field contribution of the first magnet 52 is substantially congruent to that of the second magnet 53, the desired symmetry with respect to the imaginary line 84 can be maintained by assuring that any rotation of the first magnet 52 about its longitudinal axis 54 is done simultaneously with a rotation of the second magnet 53 about its longitudinal axis 55, which is substantially equal in magnitude but opposite in direction to the rotation of the first magnet 52. In this way, and as seen by comparison of FIGS. 5, 6 and 7, the magnetic field 80, 90, 92 in the vicinity of the readout spot 82 is maintained substantially perpendicular to the plane of the recording area 14 as the magnets 52, 53 are symmetrically rotated about their longitudinal axes 54, 55. As also seen by comparing FIGS. 5, 6 and 7, during such symmetric rotation, the magnitude of the magnet field 80, 90, 92 in the vicinity of the readout spot 82 varies continuously from a maximum upward orientation 80, to a smaller upward orientation 90, eventually becoming substantially zero, then increasing until a maximum downward orientation 92 is attained. In this manner, by using two permanent magnets, the magnitude of the magnetic field 80, 90, 92 at the vicinity of the readout spot 82 can be continuously varied while maintaining the direction or orientation or polarity of the magnetic field in that vicinity in a desired configuration, such as perpendicular to the plane of the recording area 14.

Figure 4:
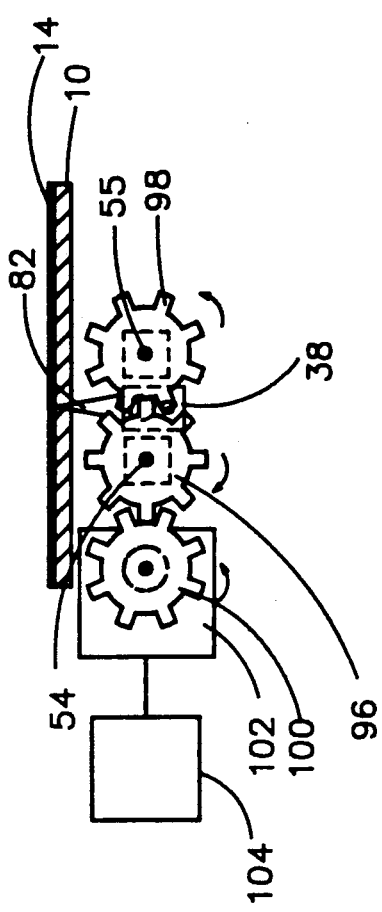
FIG. 4 is a cross-sectional view taken along line 4—4 of FIG. 1.

Various devices and methods can be used to coordinate rotation of the magnets 52, 53 to achieve the symmetry as described. One method involves mechanically coupling the magnets 52, 53 such as by rigidly connecting the magnets 52, 53 to intermeshing gears 96, 98. As depicted in FIG. 4, if the gear ratios of the two gears 96, 98 are substantially equal, rotation of the first magnet 52 will be accompanied by equal and opposite rotation of the second magnet 53. As depicted in FIG. 1, one means for achieving rotation of the magnets 52, 53 is by driving one of the gears, such as the first gear 96, with a drive gear 100. The drive gear 100 is driven by a drive means 102, such as a DC motor. The DC motor is controlled by controller circuitry 104, which receives indications of the positions of the magnets 52, 53 from the sensor 76, as described below.

Figure 8:
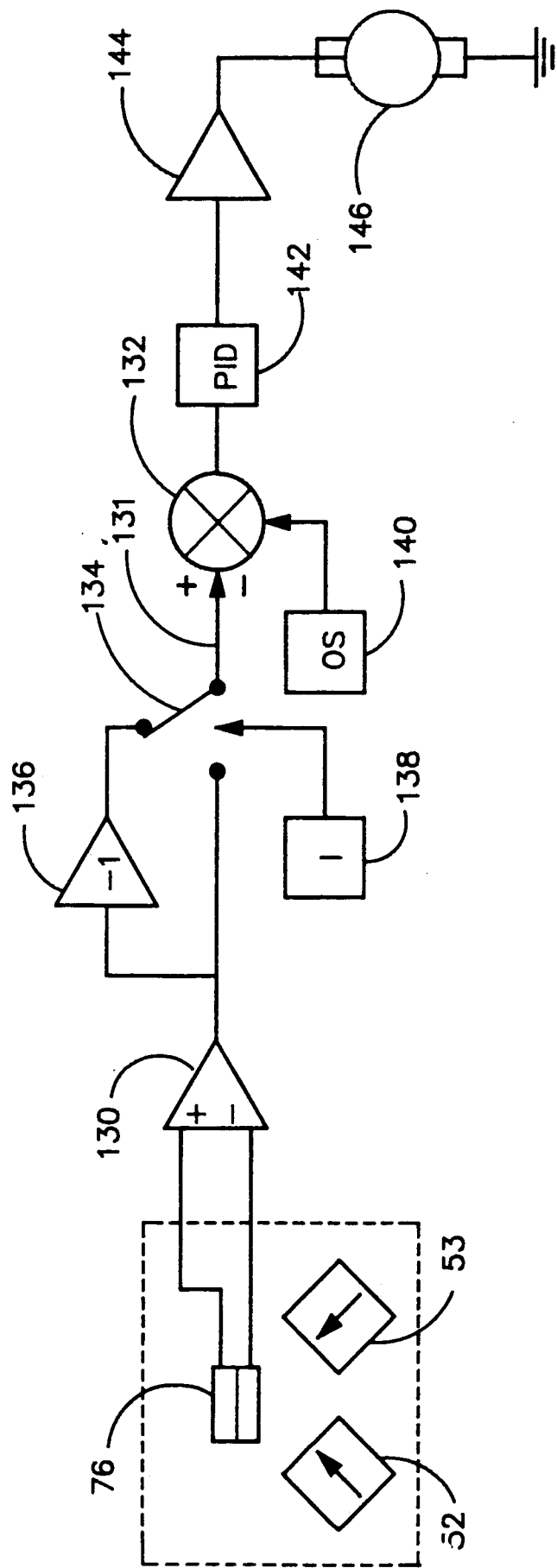
FIG. 8 is a schematic depiction of circuitry for controlling the position and rotation of the magnets.

Circuitry of various types can be used to control the polarity and field strength of the magnetic field produced by the magnets 52, 53 in the vicinity of the read out spot 82. An example of such circuitry is shown in FIG. 8. In general, the circuitry accepts as inputs a signal related to the field strength and polarity at a point in space (and thus indicative of the position of the magnets), a signal related to the desired polarity of the magnets and a signal related to the desired field strength of the magnets. The circuity outputs a signal which controls a motor in such a way as to position and maintain the magnets in the desired attitude. In the preferred embodiment, positioning and maintaining the magnets in the desired attitude is accomplished using a proportional-integral-differential (PID) circuit. A type of PID circuitry known and used in other devices, for example, as described in Applicants' copending application Ser. No. 188,261, can be used. In general terms, PID control circuitry has been utilized in the control system art in a broad range of applications where the output or control signal is proportional to a linear combination of the input signal, the time integral of the input signal, and the time rate of change of the input signal.

The PID circuitry of the present invention is used to control the rotational position of the permanent magnets 52, 53. The proportional aspect of the PID circuitry 126 provides adequate gain for the resulting control signal to be used by subsequent circuitry. The derivative aspect of the PID circuitry operates to reduce the rotational velocity of the permanent magnets 52, 53 to zero when an error signal (indicative of the deviation of the permanent magnet from the desired position) is at or near zero, thereby stopping or holding the permanent magnets 52, 53 in the desired position. The final component of the PID circuitry 126, the integral portion, overcomes any static offset due to bearing friction or the like, thereby assuring a substantially complete 180° rotation of the permanent magnet 52 without substantial overshoot or undershoot.

The input signal to the PID circuitry is an error signal which is indicative of at least both the velocity and position of the permanent magnets 52, 53. Consequently, PID circuitry operates on the error signal to reduce the velocity of the permanent magnet to zero and to assure a complete 180° rotation. The error signal which is input to the PID circuitry has a magnitude which depends on the three circuitry inputs described above. The error signal is related to the Hall sensor voltage as indicative of the rotational position of the magnets. The error signal is also related to the signal which indicates a desired polarity and the signal which indicates a desired field strength, as described more particularly below.

Referring now to FIG. 8, a Hall sensor 76 provides a voltage proportional to the field strength and polarity generated by the magnets 52, 53 to a differential amplifier 130. Diagrams of the output of the differential amplifier 130 are shown in FIGS. 9B and 10B. The output of the differential amplifier 130 is, possibly after inversion, provided as an input 131 to an adder 132 by way of a switch 134. The switch 134 is constrained to lie either in a first position, as depicted in FIG. 8, causing the output of differential amplifier 130 to be inverted by inverting amplifier 136, or to pass directly to the adder 132 without being inverted. The position of the switch 134 is controlled by a polarity signal 138. A polarity signal is depicted in FIG. 10E. Preferably, the polarity signal 138 can have one of two values, corresponding to the two positions for the switch 134. Accordingly, when the polarity signal 138 has a first value, for example, zero, the output from differential amplifier 130 is non-inverted when it reaches adder 132. When the polarity signal 138 has a second value, for example, 1, switch 134 is controlled to lie in the position depicted in FIG. 8 so that the output of differential amplifier 130 is inverted by inverting amplifier 136 before being passed to the adder 132. Thus, one input 131 to the adder 132 is an inverted or non-inverted output of the differential amplifier 130. An example of the inverted or non-inverted signal reaching the adder 132 is depicted in FIG. 10C and 9B. The second input to the adder 132 is an offset signal 140. An example of an offset signal is depicted in FIG. 9D. The offset signal 140 is added to the inverted or non-inverted differential amplifier output 131 by the adder circuit 132 to provide an input to the PID circuit 142. An example of input to the PID circuit is depicted in FIGS. 9C and 10D. The output of the PID circuit 142 is amplified by an amplifier circuit 144. The amplified signal is effective, as described above, to control rotation of a DC motor 146 to rotate the magnets 52, 53 to the desired position and polarity and to maintain the magnets 52, 53 in such a desired position and polarity The position of the magnets 52, 53 are depicted in FIGS. 9A and 10A.

Figure 9:
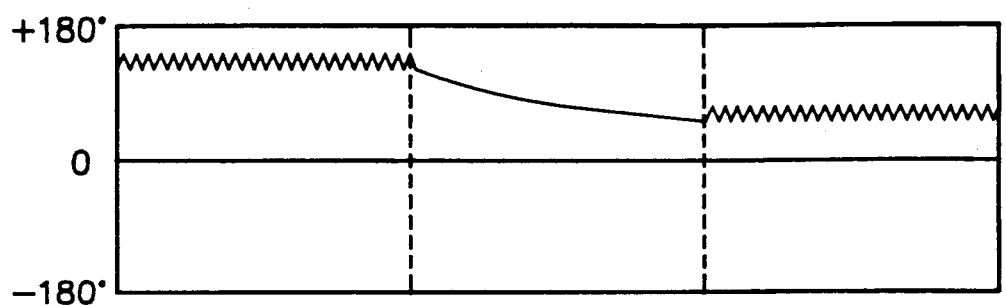
FIGS. 9A, 9B, 9C and 9D are diagrams, respectively, of the rotational position of a magnet, the Hall sensor amplifier voltage, the error signal input of the PID controller, and an offset signal during a change in the offset signal with, the horizontal axis indicating time.
Figure 9:
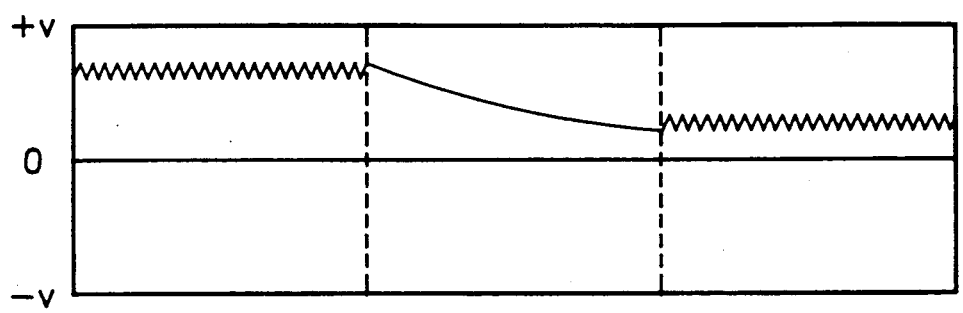
Figure 9:
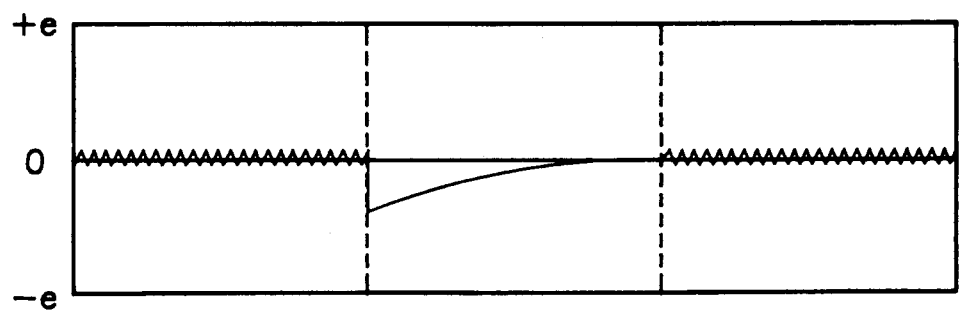
Figure 9:

FIG. 9 depicts a number of signals and magnet positions during a time period when the offset signal 140 is changed from a first value $OS_1$ to a second value $OS_2$ so as to vary the field strength produced by the magnets 52, 53 at the recording area 14, as described more fully below. As depicted in FIG. 9D, the offset signal is maintained at a first level $OS_1$ for the time period between $T_0$ and $T_1$. During this time period, the position of the magnets 52, 53 is relatively stable, as depicted in FIG. 9A, thus causing a relatively constant Hall sensor voltage, as shown in FIG. 9B, which, in turn, results in an error signal input to the PID circuit 142 which is about zero, as depicted in FIG. 9C. At time $T_1$, the offset signal 140 is changed from $OS_1$ to $OS_2$ as might be done when it is desired to change the field strength felt at the read out spot 82. Because the error signal, depicted in FIG. 9C, is related to the sum of the offset signal, depicted in FIG. 9D, and the Hall sensor voltage, depicted in FIG. 9B, the drop in the offset signal causes a drop in the error signal at time $T_1$. As discussed above, a non-zero error signal input to PID circuitry 142 causes a PID circuitry output effective to initiate rotation of the magnets 52, 53, by activating a DC motor 146. The rotation of the magnets 52, 53 is in a direction such as to cause the error signal 9C to once again approach zero. In this way, the magnets 52, 53 are rotated, as depicted in FIG. 9A, in the time period between $T_1$ and $T_2$. In the time period from $T_2$ to $T_3$, the position of the magnet, as depicted in FIG. 9A, is stabilized at a new rotational position and the error signal, as depicted in FIG. 9C, is again stabilized at about zero. In this way, adjustment of the offset signal OS is effective to adjust the rotational position of the magnets 52, 53 and thus the magnetic field strength at the read out spot 82. The desired magnitude of the field strength can be a predetermined magnitude or can be a magnitude which is intended, e.g., to compensate for differences in the magnetic characteristics of different portions of the recording medium. The optimum settings can be supplied by the media manufacturer, or experimentally determined on a sample disk. Although FIG. 9 depicts only two values of the offset signal 140, more values or continuously varying values can be used, e.g., to compensate for variations in the recording medium 14.

Figure 10:
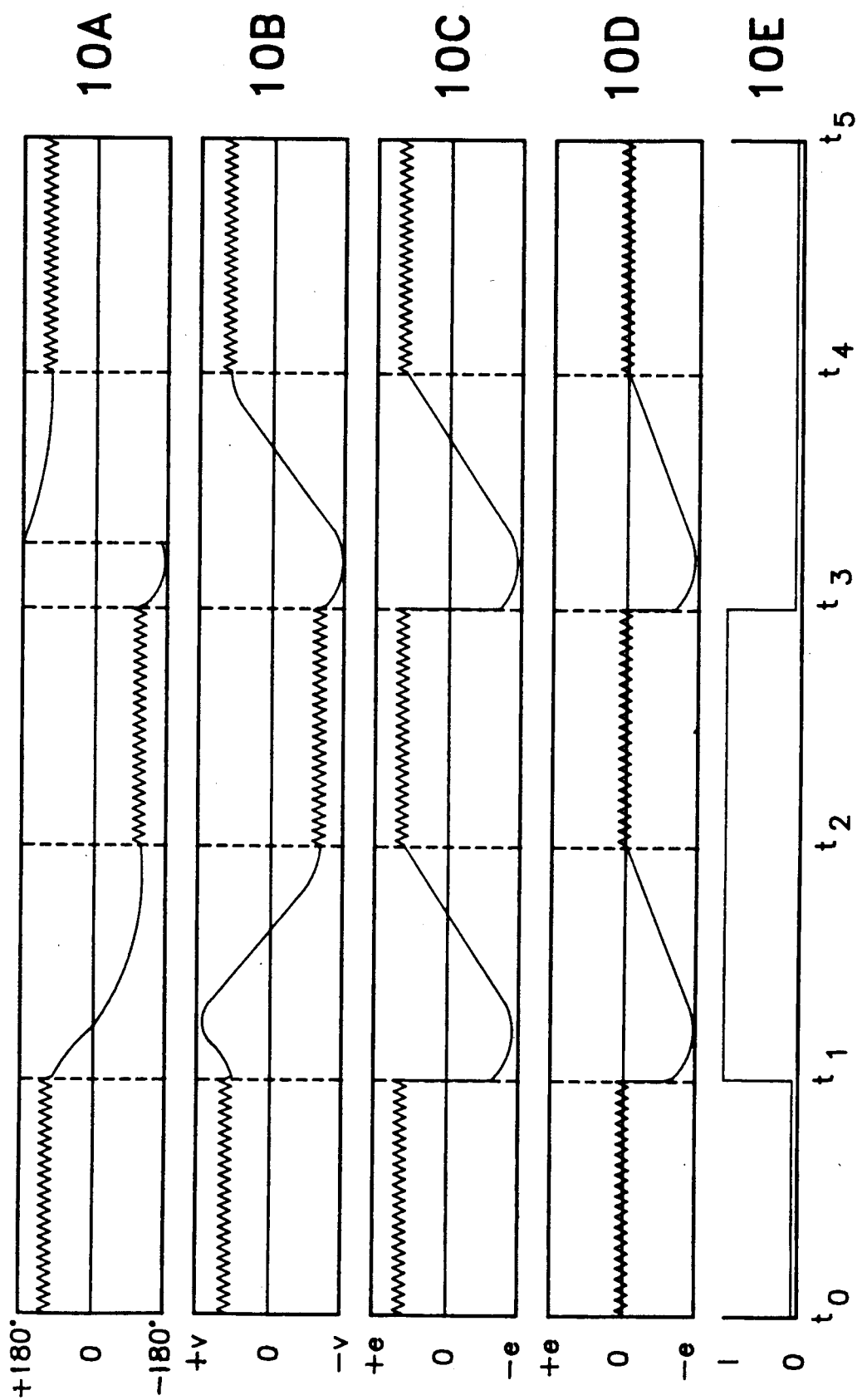
FIGS. 10A, 10B, 10C, 10D and 10E, respectively, are diagrams of the rotational position of a magnet, the Hall sensor amplifier voltage, the output of the inverter, the error signal input to the PID controller, and a polarity signal during a change from a first polarity to a second polarity with the horizontal axis indicating time.

FIG. 10 depicts a number of signals and positions of the magnets 52, 53 during two changes in the polarity signal 138, as depicted in FIG. 10E. For clarity, FIG. 10 depicts a situation in which the offset signal 140 is not changing, although the offset signal 140 can change while the polarity signal is also changing. In the time period between $T_0$ and $T_1$, the magnets 52, 53 are stabilized in the first position, as depicted in FIG. 10A. Accordingly, the voltage output by the Hall sensor 76 is also stabilized, as depicted in FIG. 10B. The signal input to the adder circuit 132 is depicted in FIG. 10C and, because of the zero value of the polarity signal 138, is uninverted with respect to the output from the differential amplifier 130. After being combined with the offset signal 140, by the adder 132, the error signal input to the PID circuit 142 is stabilized at about zero, as depicted in FIG. 10D.

At time $T_1$, the polarity signal 138 is changed from a value of zero to a value of 1 as, for example, when it is desired to reverse the polarity of the magnetic field at read out spot 82. As depicted in FIG. 10C, the signal input to the adder 132 is now inverted and thus the error signal input to the PID circuit 142, depicted in FIG. 10D, is non-zero. As discussed above, a non-zero input to the PID circuitry 142 causes the PID circuitry to output a signal which is configured to control rotation of the magnets 52, 53 so as to return the error signal to a zero value. This rotation of the magnet, depicted in FIG. 10A, occurs in the time period between $T_1$ and $T_2$. The rotation of the magnet causes corresponding changes in the output of the differential amplifier 130, depicted in FIG. 10B, and the input 131 to the adder 132, depicted in FIG. 10C. After combination with the offset signal 140, the error signal which is input to the PID is returned to about a zero value by time $T_2$. In the time period from $T_2$ to $T_3$, the position of the magnet depicted in FIG. 10A and the signals depicted in FIGS. 10B–10D are stabilized. In particular, the error signal depicted in FIG. 10D is stabilized at about zero. At time $T_3$, the inverter signal 138 is changed from a value of 1 to a value of zero. As shown in FIG. 10C, this causes the input 131 to the adder circuit 132 to change from its inverted value to its normal value, in turn causing, after combination with the offset signal 140, a drop in the error signal depicted in FIG. 10D. The non-zero error signal input to the PID circuit 142 causes rotation of the magnets, as depicted in FIG. 10A, so as to return the error signal depicted in FIG. 10D to a zero value during the time period between time $T_3$ and time $T_4$. In the time period from time $T_4$ to $T_5$, the position of the magnet is stabilized, as depicted in FIG. 10A, and the error signal input to the PID circuit 142 is stabilized at about zero, as depicted in FIG. 10D. In this manner, provision of a polarity signal, as depicted in FIG. 10E, causes the magnets 52, 53 to rotate approximately 180° to provide a magnetic field at the read out spot 82 which is of opposite polarity. The desired polarity will depend on whether it is desired to write a mark or to erase a mark and will be provided by, for example, ordinary disk controller circuitry (not shown).

As noted above, the offset signal can be changed during a time when the polarity signal is changed. In such a case, the offset signal operates to change the field strength produced by the magnets 52, 53 at the recording area 14, as described above in connection with FIG. 9, and the polarity signal operates to change the magnetic polarity of the field at the recording area 14, as described above in connection with FIG. 10.

The manner of operation of the magneto-optic system of the present invention will now be described. A magneto-optic disk 10 is installed in the system and rotated about the center of the hub 12. When a bit is to be written onto a desired location of the disk 10, the tracking means 38, 40 are used to position light from the laser 22 on the desired track, i.e. radial position of the disk 10. The controller 104 activates the drive means 102 to rotate permanent magnets 52, 53 in a direction and amount to orient the magnets 52, 53 so that a first magnetic polarity and desired magnitude is achieved in the vicinity of the magneto-optic medium 14 of the disk 10. Timing circuitry, similar to that described in U.S. Pat. No. 4,509,156 issued Apr. 2, 1985 to Ohara or U.S. Pat. No. 4,695,994 issued Sept. 22, 1987 to Steenbergen, is used to pulse the laser source 22 at a write intensity level when the read-out light spot 42 is aligned circumferentially with the desired mark position. An area of the medium 14 is heated by the laser light 42 to a temperature at which it becomes magnetizable under the influence of the magnetic field produced by the permanent magnets 52, 53. The laser light source 22 is then deactivated and the heated area of the disk 10 cools to provide a region of the disk which is magnetized in a first polarity.

When it is desired to erase a bit on the disk 10, a procedure identical to that described above in connection with writing of a bit is followed except that the controller 104 is used to achieve rotation of the magnets 52, 53 such that a magnetic field of a second polarity is produced at the surface of the disk 10. During erasing, the laser is not necessarily pulsed. It is possible to erase using a high intensity laser beam at a constant level to heat, and thus erase, continuously along the track for a period of time.

When it is desired to read one or more bits from the disk, according to one embodiment of the invention, the position of the permanent magnets 52, 53 is unimportant and either polarity magnetic field can be caused to be adjacent to the disk 10. Alternatively, the controller 104 first activates drive means 102 to rotate the permanent magnets 52, 53 such that either a third or a fourth face 106, 108 is adjacent to the disk 10 and a magnetic field of lesser intensity, as compared to the intensity of the field created by the magnets 52, 53 in the position depicted in FIG. 5, is achieved. In either case, the process of reading of the disk uses light source 22 at a low preferably continuous intensity so that a focused spot of light 42 is caused to fall on the bit position or positions to be read. This light is reflected from the disk and the reflection causes a rotation of the polarization of the light depending on the magnetization direction at the mark position. The reflected light travels through optical apparatus which can include mirrors or prisms 28, 46, polarizing beam splitters and the like. In a manner known in the art, the optical components are configured such that reflected light which has a predetermined amount of rotation imparted by the reflection is directed to the optical detector 34 whereas light which has been differently rotated has a lower intensity at the detector such that it is distinguishable from light which has been rotated in a predetermined amount or sense. In this way, the detector 34 provides a signal indicative of whether the mark position being read from the disk 10 has or has not been magnetized in a first polarity.

As will be apparent to those skilled in the art, a number of variations and modifications of the preferred embodiment can also be practiced. An apparatus can be provided in which the magnet apparatus is on the same side of the recording medium plane as the optics but which does not have two permanent magnets or which does not provide for variable field strength (in which case, it is possible to compensate for inhomogeneity of the recording medium by varying the laser intensity). It is also possible to provide a continuously variable intensity permanent magnet device which is not on the same side of the recording medium plane as the optics. Synchronization of the rotation of the first and second magnets can be achieved by gearing without also using gear means to achieve the rotation (such as by using electromagnetic actuators or belt drive or friction drive rotation means). Also, friction or belt devices can be used to achieve synchronization of rotation of the magnets. Non-rectangular cross-sectional shapes of the permanent magnet can be used, including circular cross-sections and oblong cross-sections. Magnetic material other than neodymium-iron-boron alloy can be used, including samarium cobalt magnetic material.

Although the foregoing invention has been described in detail by way of illustration and example for purposes of clarity of understanding, it will be obvious that certain changes and modifications may be practiced within the scope of the invention, as limited only by the scope of the following claims.

What is claimed is:

1. A magneto-optic data storage apparatus comprising:
   a magneto-optic storage medium lying substantially in a first plane;
   first means for producing a resultant magnetic field of variable strength which is substantially perpendicular to said first plane at at least a first portion of said medium, said first means comprising at least first and second permanent magnets, each said permanent magnet rotatable about an axis of rotation which is substantially parallel to said first plane and passes through said permanent magnet to continuously vary the field strength of said resultant magnetic field at said first portion, said first and second permanent magnets being arranged adjacent to each other to combine the individual magnetic fields of said permanent magnets to provide said resultant magnetic field wherein said resultant magnetic field is substantially continuously perpendicular to said first plane during rotation of said magnets; and
   second means for heating at least said first portion of said storage medium.

2. Data storage apparatus, as claimed in claim 1, wherein:
   said first and second permanent magnets are rotatably mounted adjacent to said storage medium with substantially parallel axes of rotation.

3. Data storage apparatus, as claim in claim 1, wherein:
   said first means comprises gear means for simultaneously rotating said first and second permanent magnets in opposite directions.

4. Data storage apparatus, as claimed in claim 1, wherein:
   said first means comprises an electric motor for rotating said first and second permanent magnets about said axes of rotation.

5. Magnetic field production apparatus usable with a magneto-optic data storage apparatus having a magneto-optic storage medium comprising:
   a first permanent magnet rotatable about a first axis positioned adjacent to said storage medium to selectively provide a magnetic field in either of two polarities at said storage medium; and
   a second permanent magnet rotatable about a second axis adjacent and substantially parallel to said first axis and adjacent to said storage medium to provide a magnetic field in either of two polarities at said storage medium, said first and second permanent magnets being arranged adjacent to each other to combine the individual magnetic fields of each of said permanent magnets wherein a continuously variable resultant magnetic field is produced continuously substantially perpendicular to said storage medium during rotation of said magnets.

6. A magnetic field production apparatus, as claimed in claim 5, further comprising:
   gear means for rotating said first and second permanent magnets wherein the direction of said rotation of said first magnet is opposite to the direction of said rotation of said second magnet.

7. A magnetic field production apparatus, as claimed in claim 5, further comprising:
   electric motor means for rotating said first permanent magnet and said second permanent magnet.

8. Magnetic field production apparatus usable with magneto-optic data storage apparatus having a magneto-optic storage medium comprising:
   a first permanent magnet rotatable about a first axis positioned adjacent to said storage medium to selectively provide a magnetic field in either of two polarities at said storage medium; and
   a second permanent magnet rotatable about a second axis adjacent and substantially parallel to said first axis and adjacent to said storage medium to selectively provide a magnetic field in either of two polarities at said storage medium; and
   means for directing a light beam toward said storage medium; wherein
   said light beam is positioned substantially between said first permanent magnet and said second permanent magnet.

9. A magnetic field production apparatus, as claimed in claim 5, wherein:
   said storage medium is annularly positioned on at least a first radial expanse of a rotatable disk;
   said first permanent magnet extends substantially across said first radial expanse; and
   said second permanent magnet extends substantially across said first radial expanse.

10. A method for varying a magnetic field applied to a planar magneto-optic recording medium comprising:
    providing a first permanent magnet rotatably mounted adjacent to said medium;
    providing a second permanent magnet rotatably mounted adjacent to said medium with an axis of rotation substantially parallel to the axis of rotation of said first permanent magnet;

rotating said first permanent magnet;

rotating said second permanent magnet; and generating a resultant magnetic field of variable strength using said first and second permanent magnets wherein said resultant magnetic field at at least a first portion of the medium is continuously substantially perpendicular to said planar recording medium.

11. A method, as claimed in claim 10, wherein:

said step of rotating said second permanent magnet comprises rotating said second permanent magnet in a direction opposite to the direction of rotation of said first permanent magnet.

12. A method, as claimed in claim 10, wherein:

said step of rotating said second permanent magnet comprises rotating said second permanent magnet simultaneously with said rotation of said first permanent magnet, wherein the angular amount of rotation of said first permanent magnet is substantially equal to the annular amount of rotation of said second permanent magnet.

13. Apparatus for controlling variations in magnetic field strength in a magneto-optic system having a magneto-optic recording medium and at least two rotatable permanent magnets to provide a desired magnetic field strength comprising:

signal-controllable means for rotating said two permanent magnets;

means for providing a first signal related to said desired magnetic field strength;

means for producing a second signal related to at least one of field strength and position of one of said two rotatable permanent magnets;

means for generating a third signal related to at least one of field strength and position of the other of said two rotatable permanent magnets; and means for using said first signal, said second signal and said third signal to produce a control signal for controlling said signal-controllable means.

14. A magneto-optic data storage apparatus comprising:

a magneto-optic data storage medium comprising magnetizable material annularly positioned on at least a first radial expanse of a rotatable disk and lying substantially in a first plane;

a first permanent magnet rotatable about a first longitudinal axis substantially parallel to said first plane, said first permanent magnet extending substantially across said first radial expanse;

first gear means for rotating said first permanent magnet about said first longitudinal axis;

a second permanent magnet rotatable about a second longitudinal axis substantially parallel to said first plane and substantially parallel to said first longitudinal axis, said second permanent magnet extending substantially across said radial expanse, wherein said first and second permanent magnets provide a resultant magnetic field;

second gear means for rotating said second permanent magnet about said second longitudinal axis, said second gear means operatively connected to said first gear means wherein said first gear means and said second gear means are operative to rotate said first permanent magnet and said second permanent magnet said resultant magnetic field has a variable intensity during rotation of said permanent magnets in either of a first or second magnetic polarity directed continuously substantially perpendicular to said first plane at a first portion of said storage medium;

optics means for directing a light beam towards said first portion to heat said first portion to at least a temperature at which said medium is magnetizable at said first field strength, said optics means being on the same side of said first plane as said first permanent magnet and said second permanent magnet and said optics means being mechanically independent from said first permanent magnet and said second permanent magnet.

15. A magneto-optic data storage apparatus comprising:

a magneto-optic storage medium lying substantially in a first plane;

first means including at least first and second permanent magnets for creating a resultant magnetic field at at least a first portion of said medium with at least a first field strength, selectable to create said resultant magnetic field in either of a first or second magnetic polarity, said resultant magnetic field being a variable intensity with said intensity depending upon positions of said first and second permanent magnets; and second means for directing a light beam towards said first portion to heat said first portion to at least a temperature at which said medium is magnetizable at said first field strength, said second means being on the same side of said first plane as said first means, and said second means being mechanically independent from said first means.

* * * * *